United States Patent
Tanaka

(10) Patent No.: US 10,389,080 B2
(45) Date of Patent: Aug. 20, 2019

(54) RESIDUAL LIGHT REMOVAL STRUCTURE AND FIBER LASER

(71) Applicant: FUJIKURA LTD., Tokyo (JP)

(72) Inventor: Hironori Tanaka, Sakura (JP)

(73) Assignee: FUJIKURA LTD., Tokyo (JP)

( * ) Notice: Subject to any disclaimer, the term of this patent is extended or adjusted under 35 U.S.C. 154(b) by 0 days.

(21) Appl. No.: 15/222,259

(22) Filed: Jul. 28, 2016

(65) Prior Publication Data
US 2016/0336710 A1    Nov. 17, 2016

Related U.S. Application Data

(63) Continuation of application No. PCT/JP2015/052806, filed on Feb. 2, 2015.

(30) Foreign Application Priority Data

Feb. 3, 2014    (JP) .................................. 2014-018601

(51) Int. Cl.
*G02B 6/14* (2006.01)
*G02B 6/26* (2006.01)
(Continued)

(52) U.S. Cl.
CPC ........ *H01S 3/094007* (2013.01); *G02B 6/264* (2013.01); *H01S 3/0405* (2013.01);
(Continued)

(58) Field of Classification Search
CPC .............. H01S 3/094007; H01S 3/0405; H01S 3/06729; H01S 3/06754; G01B 6/4296
See application file for complete search history.

(56) References Cited

U.S. PATENT DOCUMENTS 5,926,592 A * 7/1999 Harris ................ G02B 21/0024
                                                                385/127
5,995,697 A * 11/1999 Byron ................ G02B 6/02104
                                                                385/123
(Continued)

FOREIGN PATENT DOCUMENTS

CN    1291291 A    4/2001
CN    102124383 A    7/2011
(Continued)

OTHER PUBLICATIONS

International Search Report dated Apr. 28, 2015, issued in counterpart International Application No. PCT/JP2015/052806 (2 pages).
(Continued)

*Primary Examiner* — Joshua King
(74) *Attorney, Agent, or Firm* — Westerman, Hattori, Daniels & Adrian, LLP

(57) ABSTRACT

A residual light removal structure 70 is used to remove residual light in a double-clad fiber 40 having a core 60, a cladding 62 having a refractive index lower than a refractive index of the core 60, and a covering material 64 having a refractive index lower than the refractive index of the cladding 62. The residual light removal structure 70 has a fiber housing 72 that houses part of the double-clad fiber 40, a cladding exposure portion 74 in which part of the whole circumference of the cladding 62 is exposed from the covering material 64 along a longitudinal direction of the double-clad fiber 40, and a resin 76 filled within the fiber housing 72 so as to cover at least the cladding exposure portion 74. The resin 76 has a refractive index that is equal to or higher than the refractive index of the cladding 62. For example, the cladding exposure portion is formed with a range of angles less than 180° about an axis of the double-clad fiber 40 in a cross-section perpendicular to the axis.

14 Claims, 9 Drawing Sheets

(51) Int. Cl.
*G02B 6/42* (2006.01)
*H01S 3/04* (2006.01)
*H01S 3/067* (2006.01)
*H01S 3/094* (2006.01)

(52) U.S. Cl.
CPC ...... *H01S 3/06729* (2013.01); *H01S 3/06754* (2013.01); *G02B 6/14* (2013.01); *G02B 6/4296* (2013.01)

(56) References Cited

U.S. PATENT DOCUMENTS

| | | | | |
|---|---|---|---|---|
| 6,370,312 | B1* | 4/2002 | Wagoner | G02B 6/266 385/140 |
| 6,567,585 | B2* | 5/2003 | Harris | G02B 6/4298 359/368 |
| 7,496,259 | B2* | 2/2009 | Karasawa | A61B 1/00096 385/118 |
| 2002/0186947 | A1* | 12/2002 | Abe | G02B 6/02014 385/127 |
| 2005/0040377 | A1* | 2/2005 | Drotleff | G02B 6/1221 252/586 |
| 2006/0062518 | A1* | 3/2006 | Galstian | B82Y 10/00 385/27 |
| 2007/0065083 | A1* | 3/2007 | Singh | G02B 6/001 385/126 |
| 2007/0253669 | A1 | 11/2007 | Singh | |
| 2008/0223822 | A1 | 9/2008 | Singh | |
| 2009/0074362 | A1* | 3/2009 | Oba | G02B 6/2558 385/96 |
| 2009/0080835 | A1* | 3/2009 | Frith | G02B 6/14 385/50 |
| 2010/0163537 | A1* | 7/2010 | Furuta | B23K 26/38 219/121.72 |
| 2010/0188735 | A1* | 7/2010 | Tamaoki | G02B 6/2551 359/341.3 |
| 2011/0249935 | A1* | 10/2011 | Hu | G02B 6/14 385/27 |
| 2013/0087694 | A1* | 4/2013 | Creeden | G01J 1/0425 250/227.11 |
| 2013/0308661 | A1* | 11/2013 | Nishimura | H01S 3/06733 372/6 |
| 2014/0211818 | A1* | 7/2014 | Hou | H01S 3/094007 372/6 |

FOREIGN PATENT DOCUMENTS

| | | |
|---|---|---|
| JP | 63-41804 A | 2/1988 |
| JP | 2004-240415 A | 8/2004 |
| JP | 2007-86779 A | 4/2007 |
| JP | 2007-206367 A | 8/2007 |
| JP | 2009069492 A * | 4/2009 |
| JP | 2010-181574 A | 8/2010 |
| JP | 2010181574 A * | 8/2010 |
| JP | 2011-186399 A | 9/2011 |
| JP | 2011186399 A * | 9/2011 |
| NO | 2013/001734 A1 | 1/2013 |
| WO | 99/42867 A1 | 8/1999 |
| WO | 2009/155707 A1 | 12/2009 |

OTHER PUBLICATIONS

Extended (supplementary) European Search Report dated Oct. 2, 2017, issued in counterpart European Application No. 15743739.3. (7 pages).

Office Action dated Jun. 1, 2018, issued in counterpart Chinese Application No. 201580007040.1, with English translation. (10 pages).

\* cited by examiner

RESIDUAL LIGHT REMOVAL STRUCTURE AND FIBER LASER

TECHNICAL FIELD

The present invention relates to a residual light removal structure, and more particularly to a residual light removal structure for removing residual light from light propagating through an optical fiber of a fiber laser.

BACKGROUND ART

In a clad-pumping type fiber laser using a double-clad fiber, pump light that has not been absorbed in a Core (residual pump light) propagates through a cladding even in an output portion of a cavity. Particularly, because a high-power fiber laser is supplied with pump light having some power, residual pump light tends to be generated at an output portion of a cavity. Such residual pump light propagates in a multi-mode and thus has low beam quality. Accordingly, if such residual pump light is emitted from a fiber laser along with signal light, the quality of the output beam from the fiber laser is impaired, so that fine processing cannot be achieved with use of the output beam.

Furthermore, emission optics such as isolators or collimators are designed only for transmitting signal light in view of the controllability of the quality and the cost. Therefore, when residual pump light is introduced into those emission optics, unintentional optical absorption may occur to cause generation of heat or a serious accident such as fire.

Accordingly, residual pump light needs to be emitted to an exterior of an optical fiber before it reaches a laser output end. The following mechanism has been known as a mechanism for emitting such residual pump light to an exterior of an optical fiber. A covering material of a double-clad fiber is removed over its whole circumference so as to expose a cladding, and an exposed cladding is sandwiched between two optical substrates having a refractive index higher than that of the covering material (see, e.g., Patent Literature 1). When a cladding is thus sandwiched between optical substrates having a high refractive index, residual pump light can be emitted into the optical substrates at a contact area between the exposed portion of the cladding and the optical substrates.

With this structure, however, the cladding has line contact with the optical substrates. Therefore, this structure requires that the length of the line contact considerably be increased in order to sufficiently remove the residual pump light, and is thus inefficient. Additionally, since the covering material needs to be removed over a long distance, the cladding is likely to be damaged during the removal process of the covering material. Therefore, this structure lacks the reliability.

From this point of view, there has been proposed a structure as shown in FIG. 1. With the structure shown in FIG. 1, two double-clad fibers 510 and 610 are fused within a space surrounded by a reinforcement member 500. A downstream end of a covering material 520 of the double-clad fiber 510 is removed over its whole circumference. Thus, a cladding 530 is exposed from the covering material 520. Similarly, an upstream end of a covering material 620 of the double-clad fiber 610 is removed over its whole circumference, and a cladding 630 is thus exposed from the covering material 620. An exposed end of the cladding 530 of the double-clad fiber 510 and an exposed end of the cladding 630 of the double-clad fiber 610 are fused at a fusion splicing point 700.

A space around those exposed claddings 530 and 630 (and around the covering materials 520 and 630) is filled with a resin 540 having a refractive index that is equal to or higher than those of the claddings 530 and 630. With this structure, the exposed cladding 530 is held in contact with the resin 540 over its whole circumference. Thus, a large contact area between the cladding 530 and the resin 540 improves the efficiency of emitting residual pump light from the cladding 530 into the resin 540.

With the structure shown in FIG. 1, however, a portion of the covering material 520 is removed over its whole circumference. Therefore, residual pump light that has propagated through the cladding 530 and the core is locally emitted into the resin 540 at the most upstream part 542 of the fiber portion from which the covering material 520 has been removed. Accordingly, the residual pump light is locally absorbed in the resin 540 at the most upstream part 542, where the amount of generated heat is increased Such local heat generation may increase the temperature of a local area of the double-clad fiber 510, resulting in greatly lowered reliability.

PRIOR ART LITERATURE

Patent Literature

Patent Literature 1: JP 2010-181574 A

SUMMARY OF THE INVENTION

Problem(s) to be Solved by the Invention

The present invention has been made in view of the above drawbacks of the prior art. It is, therefore, a first object of the present invention to provide a residual light removal structure that can efficiently remove residual light and can suppress local heat generation due to emission of the residual light to improve the reliability.

A second object of the present invention is to provide a fiber laser capable of emitting a high-quality laser beam with high reliability.

Means for Solving Problem(s)

According to a first aspect of the present invention, there is provided a residual light removal structure that can efficiently remove residual light and can suppress local heat generation due to emission of the residual light to improve the reliability. The residual light removal structure is used to remove residual light in a double-clad fiber having a core, a cladding (inner cladding) covering the core and having a refractive index lower than a refractive index of the core, and a covering material (outer cladding) covering the cladding and having a refractive index lower than the refractive index of the cladding. The residual light removal structure has a fiber housing that houses part of the double-clad fiber, a cladding exposure portion in which part of a whole circumference of the cladding is exposed from the covering material along a longitudinal direction of the double-clad fiber, and a first resin filled within the fiber housing so as to cover at least the cladding exposure portion. The first resin has a refractive index that is equal to or higher than the refractive index of the cladding.

With such a configuration, when the residual pump light that has propagated through the cladding in the double-clad fiber reaches an interface between the cladding exposure portion and the first resin, it enters into the first resin since the refractive index of the first resin is equal to or higher than the refractive index of the cladding. Thus, the residual pump light is emitted into the first resin. Accordingly, it is possible to prevent degradation of the quality of the laser beam that would be caused by residual pump light emitted together with the signal light and also to prevent generation of heat or fire that would be caused on a downstream side of the residual light removal structure by residual pump light. Thus, the reliability of the emission optics can be improved.

At that time, only part of the whole circumference of the cladding is exposed in the cladding exposure portion. Therefore, the amount of the residual pump light emitted into the first resin at the most upstream part of the cladding exposure portion can be reduced as compared to a conventional structure in which the whole circumference of the cladding is exposed. Accordingly, it is possible to suppress local heat generation caused by residual pump light absorbed in the first resin and thus to improve the reliability of the residual light removal structure.

According to a second aspect of the present invention, there is provided a fiber laser capable of emitting a high-quality laser beam with high reliability. The fiber laser has a signal light generator operable to generate signal light a pump laser diode operable to generate pump light and a clad pumping fiber. The clad pumping fiber has a core through which the signal light propagates, a cladding which covers the core and through which the pump light propagates, and a covering material covering the cladding and having a refractive index lower than a refractive index of the cladding. The fiber laser includes the aforementioned residual light removal structure configured to remove residual light in the clad pumping fiber.

It is preferable to form the cladding exposure portion with a range of angles less than 180° about an axis of the double-clad fiber in a cross-section perpendicular to the axis. Since the cladding is exposed only within a range of angles less than 180° of the whole circumstance about its axis, when a force is applied to the covering material, a radial force obtained by decomposition of such a force acts so as to press the covering material upon the cladding somewhere in the covering material. Accordingly, the covering material is unlikely to be peeled.

The fiber housing may preferably include a heat radiator plate that is disposed so as to face the cladding exposure portion and has a good thermal radiation characteristic. Furthermore, a second resin having a refractive index lower than the refractive index of the covering material may be filled on an upstream end of the cladding exposure portion within the fiber housing.

Advantageous Effects of the Invention

According to a residual light removal structure of the present invention, it is possible to efficiently remove residual light and to suppress local heat generation due to emission of the residual light to improve the reliability. Furthermore, according to a fiber laser of the present invention, there can be provided a fiber laser capable of emitting a high-quality laser beam with high reliability.

MODE(S) FOR CARRYING OUT THE INVENTION

Figure 1:
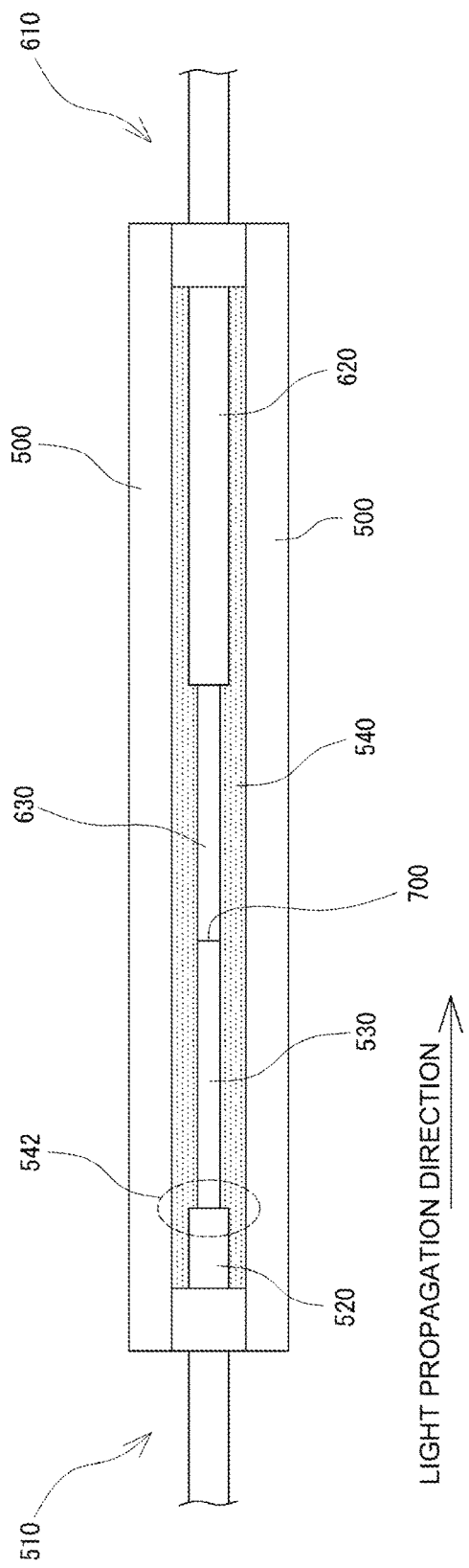
FIG. 1 is a diagram schematically showing a conventional residual light removal structure for double-clad fibers.

Embodiments of a residual light removal structure according to the present invention will be described in detail below with reference to FIGS. 2 to 9. In FIGS. 2 to 9, the same or corresponding components are denoted by the same or corresponding reference numerals and will not be described below repetitively.

Figure 2:
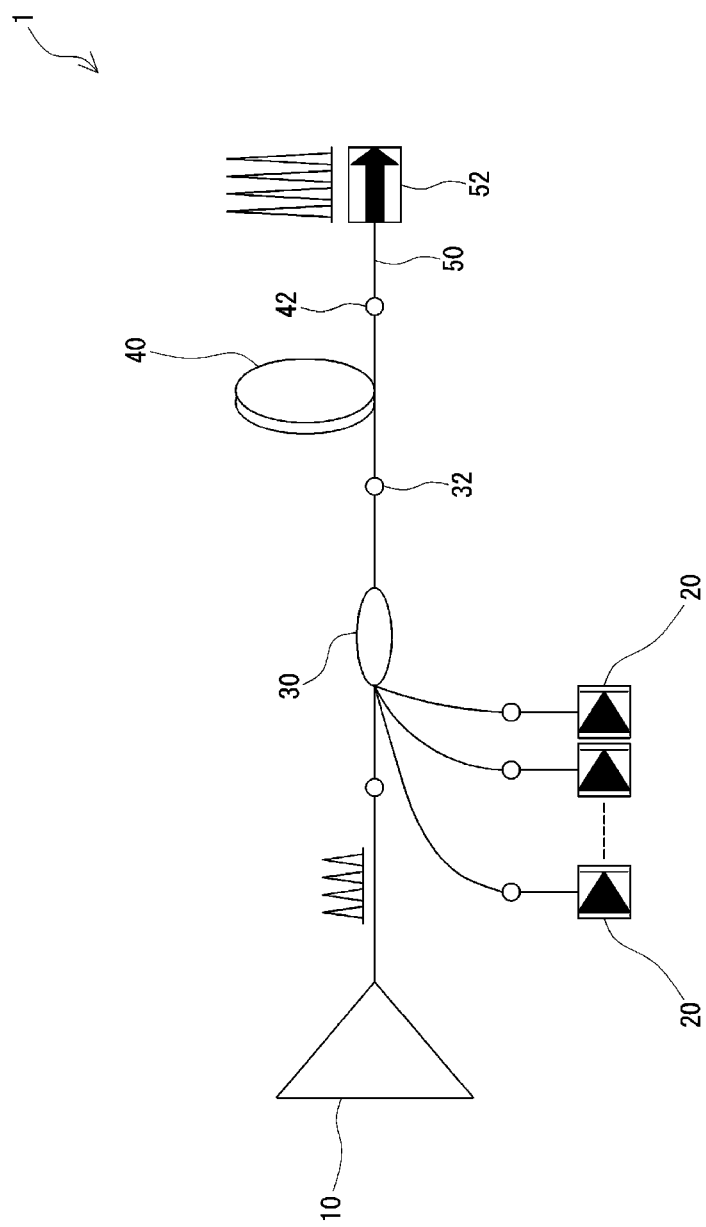
FIG. 2 is a schematic diagram showing a fiber laser according to a first embodiment of the present invention.

FIG. 2 is a schematic diagram showing a fiber laser 1 according to a first embodiment of the present invention. The fiber laser 1 has a signal light generator 10 operable to generate signal light, a plurality of pump laser diodes (LDs) 20 operable to generate pump light, an optical coupler 30 operable to couple the signal light from the signal light generator 10 and pump light from the pump LDs 20 and to output the coupled light, a clad pumping fiber 40 having an end connected to an output end 32 of the optical coupler 30, an output optical fiber 50 connected to an output end 42 of the clad pumping fiber 40, and an isolator 52 provided on the output optical fiber 50.

Figure 3:
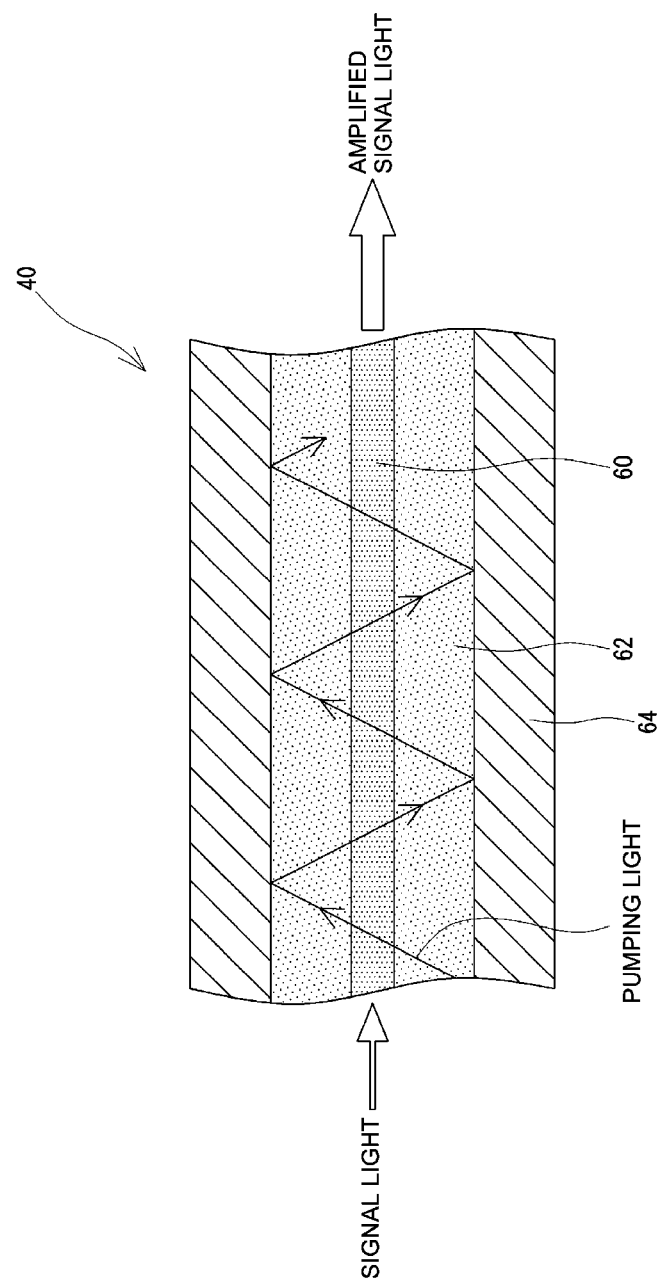
FIG. 3 is a cross-sectional view schematically showing a structure of a clad pumping fiber in the fiber laser illustrated in FIG. 2.

FIG. 3 is a cross-sectional view schematically showing the clad pumping fiber 40. As shown in FIG. 3, the clad pumping fiber 40 includes a core 60 for transmitting signal light generated by the signal light generator 10, a cladding (inner cladding) 62 covering the core 60, and a covering material (outer cladding) 64 covering the cladding 62. For example, the core 60 is formed of $SiO_2$ doped with a rare earth element such as Yb. The core 60 serves as a signal light waveguide for transmitting the signal light. The cladding 62 is formed of a material having a refractive index lower than a refractive index of the core 60 (e.g., $SiO_2$). The covering material 64 is formed of a resin having a refractive index lower than the refractive index of the cladding 62 (e.g., polymer with a low refractive index). Thus, the cladding 62 serves as a pump light waveguide for transmitting the pump light.

With a clad pumping fiber 40 thus constructed, signal light from the signal light generator 10 propagates within the core 60, and pump light from the pump LDs 20 propagates within the cladding 62 and the core 60. While the pump light propagates through the core 60, ions of the rare earth element doped in the core 60 absorb the pump light to cause excitation. Thus, the signal light propagating through the core 60 is amplified by stimulated emission.

Thus, the pump light is attenuated because it is absorbed in the core 60 while it propagates through the clad pumping fiber 40. As described above, however, the pump light that has not been absorbed in the core (residual pump light) is seen at an output side of the clad pumping fiber 40. In the present embodiment, a residual light removal structure 70 as shown in FIG. 4 is provided near an output end of the clad pumping fiber 40 in order to prevent such residual pump light from impairing the quality of an output beam or from causing generation of heat or fire in emission optics such as an isolator 52.

Figure 4:
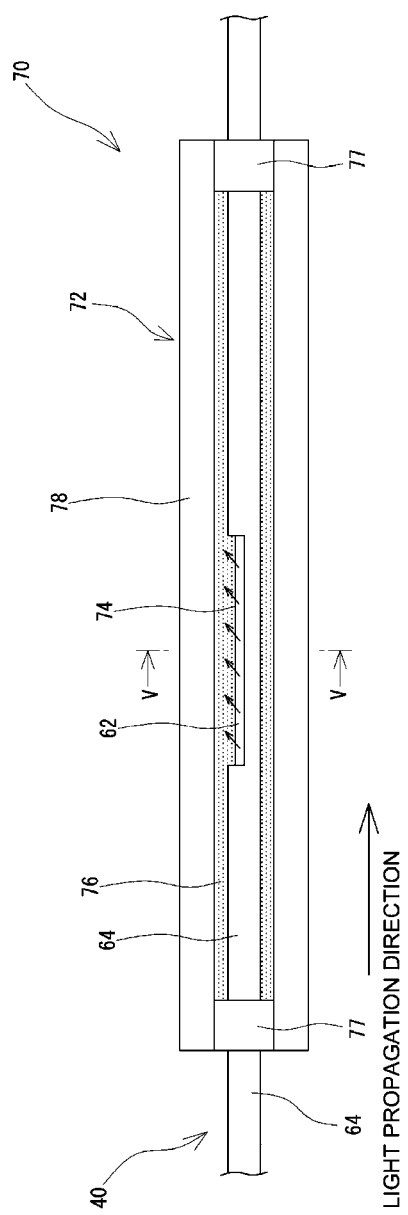
FIG. 4 is a diagram schematically showing a residual light removal structure of the fiber laser illustrated in FIG. 2.
Figure 5:
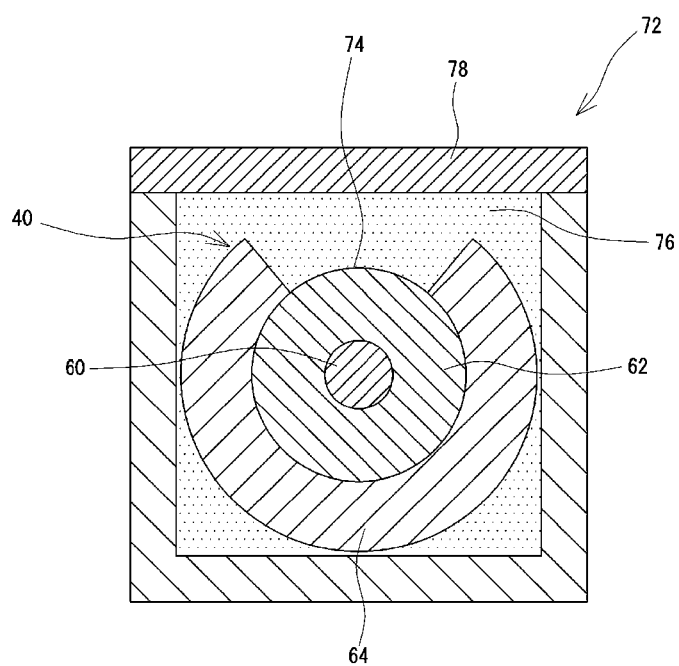
FIG. 5 is a cross-sectional view taken along line V-V of FIG. 4.

FIG. 4 is a diagram schematically showing a residual light removal structure 70 according to a first embodiment of the present invention, and FIG. 5 is a cross-sectional view taken along line V-V of FIG. 4. As shown in FIGS. 4 and 5, the residual light removal structure 70 has a fiber housing 72 that is substantially in the form of a rectangular parallelepiped and houses part of the clad pumping fiber 40. Within the fiber housing 72, a portion of the covering material 64 is removed over part of the whole circumference of the clad pumping fiber 40, for example, within a range of angles less than 180° (e.g., 60°) about an axis of the clad pumping fiber 40 in a cross-section perpendicular to that axis (FIG. 5). Therefore, the cladding 62 is exposed from the covering material 64 within this area to form a cladding exposure portion 74. As shown in FIG. 4, this cladding exposure portion 74 extends along a longitudinal direction of the clad pumping fiber 40 by a predetermined length.

Furthermore, an interior of the fiber housing 72 is filled with a resin (e.g., thermosetting resin) 76 having a refractive index that is equal to or higher than the refractive index of the cladding 62. The cladding exposure portion 74 is covered with this resin 76. The reference numeral 77 in FIG. 4 denotes a hard resin material, which seals the interior of the fiber housing 72.

With such a configuration, when the residual pump light that has propagated through the cladding 62 reaches an interface between the cladding exposure portion 74 and the resin 76, it enters into the resin 76 since the refractive index of the resin 76 is equal to or higher than the refractive index of the cladding 62. Thus, the residual pump light is emitted to an exterior of the clad pumping fiber 40 (to the resin 76). Accordingly, it is possible to prevent degradation of the quality of the laser beam that would be caused by residual pump light emitted together with the signal light and also to prevent generation of heat or fire that would be caused on a downstream side of the residual light removal structure 70 by residual pump light. Thus, the reliability of the emission optics can be improved.

In the cladding exposure portion 74 of the present embodiment, only part of the whole circumference of the cladding 62 is exposed. Therefore, the amount of the residual pump light emitted into the resin 76 at the most upstream part of the cladding exposure portion 74 can be reduced as compared to the conventional structure shown in FIG. 1 in which the whole circumference of the cladding is exposed. Accordingly, it is possible to suppress local heat generation caused by residual pump light absorbed in the resin 76 and thus to improve the reliability of the residual light removal structure 70.

Figure 6:
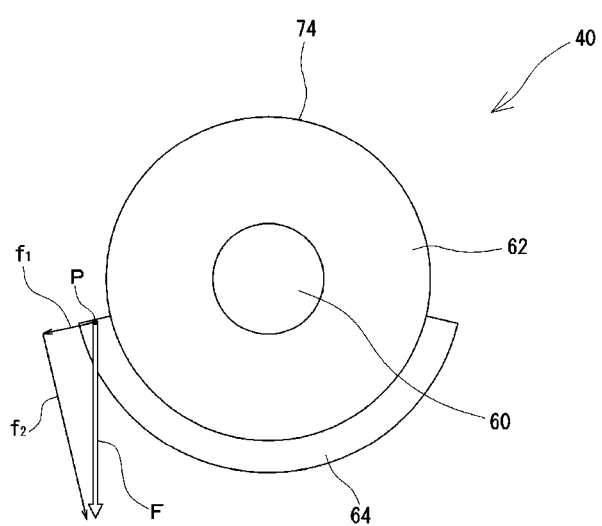
FIG. 6 is a diagram schematically showing forces applied to a covering material when a cladding exposure portion is exposed with an angle that is equal to or greater than 180°.
Figure 7:
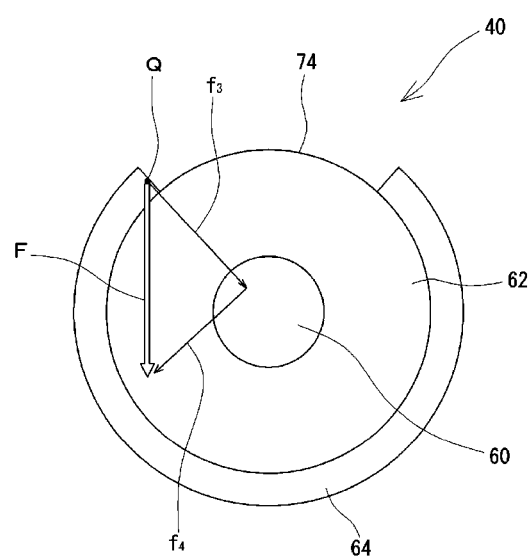
FIG. 7 is a diagram schematically showing forces applied to a covering material when a cladding exposure portion is exposed with an angle that is less than 180°.

At that time, the cladding exposure portion 74 needs to expose part of the whole circumference of the cladding 62. It is preferable to form a cladding exposure portion 74 with an angle less than 180° about the axis of the clad pumping fiber 40 in a cross-section (FIG. 5) perpendicular to that axis as in the present embodiment. As shown in FIG. 6, when the cladding exposure portion 74 is formed with an angle that is equal to or greater than 180° about the axis of the clad pumping, fiber 40, for example, a force F applied to a point P of the covering material 64 can be decomposed into a radial force $f_1$ and a tangential force $f_2$. At that time, as seen from FIG. 6, the radial force $f_1$ acts so as to peel the covering material 64 from the cladding 62. This is not limited to the point P. A radial force obtained by decomposition of a force F applied to any point of the covering material 64 acts so as to peel the covering material 64 from the cladding 62. Meanwhile, as shown in FIG. 7, when the cladding exposure portion 74 is formed with an angle that is less than 180° about the axis of the clad pumping fiber 40, for example, a force F applied to a point Q of the covering material 64 can be decomposed into a radial force $f_3$ and a tangential force $f_4$. The radial force $f_3$ acts so as to press the covering material 64 on the cladding 62. Specifically, in the case where the cladding exposure portion 74 is formed with an angle that is less than 180° about the axis of Ute clad pumping fiber 40, a force is applied so as to press at least part of the covering material 64 onto the cladding 62. Therefore, the cladding exposure portion 74 formed with an angle that is less than 180° about the axis of the clad pumping fiber 40 is advantageous in that the covering material 64 is less likely to be peeled as compared to the case where the cladding exposure portion 74 is formed with an angle that is equal to or greater than 180°.

As shown in FIG. 5, a portion of the fiber housing 72 is formed by a heat radiator plate 78 having good thermal radiation characteristics. The heat radiator plate 78 is disposed so as to face the cladding exposure portion 74. When such a heat radiator plate 78 having good thermal radiation characteristics is disposed so as to face the cladding exposure portion 74, heat generated in the resin 76 by the residual pump light emitted into the resin 76 can effectively be radiated through the heat radiator plate 78. Examples of such a heat radiator plate 78 include metal plates living a surface anodized with aluminum or aluminum alloy.

Figure 8:
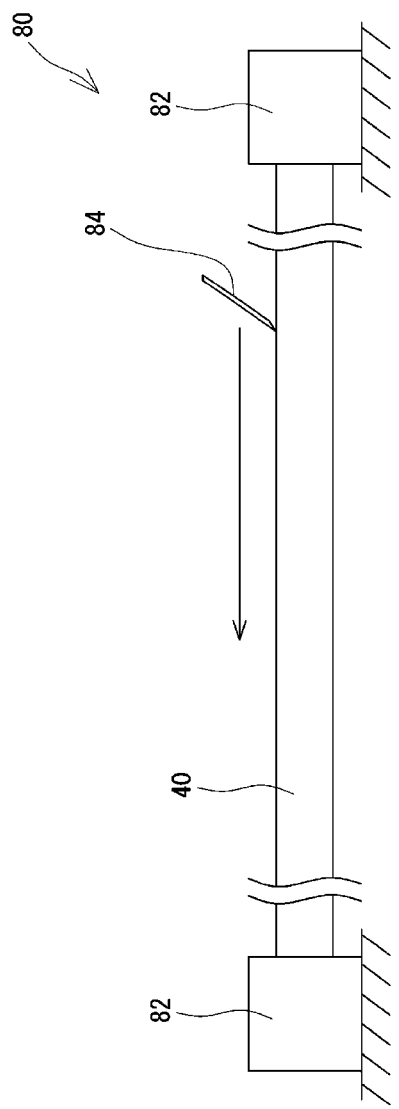
FIG. 8 is a schematic diagram showing an apparatus for forming a cladding exposure portion in a clad pumping fiber illustrated in FIG. 4.

For example, the aforementioned cladding exposure portion 74 can be formed with use of an apparatus 80 as shown in FIG. 8. The apparatus 80 has holders 82 for holding opposite ends of the clad pumping fiber 40 and a blade 84 in the form of a plane for shaving a surface of the clad pumping fiber 40.

When the cladding exposure portion 74 is formed with use of this apparatus 80, the clad pumping fiber 40 is first held by the holders 82. In that state, the blade 84 is brought into contact with the surface of the clad pumping fiber 40 and moved in a longitudinal direction of the clad pumping fiber 40 by a certain distance. Thus, the covering material 64 present on the surface of the clad pumping fiber 40 is peeled by the certain distance so as to expose the cladding 62 from the covering material 64.

Then the clad pumping fiber 40 held by the holders 82 is rotated through 20° about its axis, and the blade 84 is moved back to the original position. Thereafter, the blade 84 is brought into contact with the surface of the clad pumping fiber 40 again and moved in the longitudinal direction of the clad pumping fiber 40 by the same distance as being previously moved. Thus, the covering material 64 is similarly peeled by the certain distance so as to expose the cladding 62 from the covering material 64. For example, the above operation is repeated once again to expose the cladding 62 from the covering material 64 with a range of 60° about the axis of the clad pumping fiber 40 in the cross-section perpendicular to that axis (FIG. 5). Thus, the aforementioned cladding exposure portion 74 is formed. In this manner, the size of the cladding exposure portion 74 can be controlled by the number of shaving processes using the blade 84 and a rotation angle of the clad pumping fiber 40.

Figure 9:
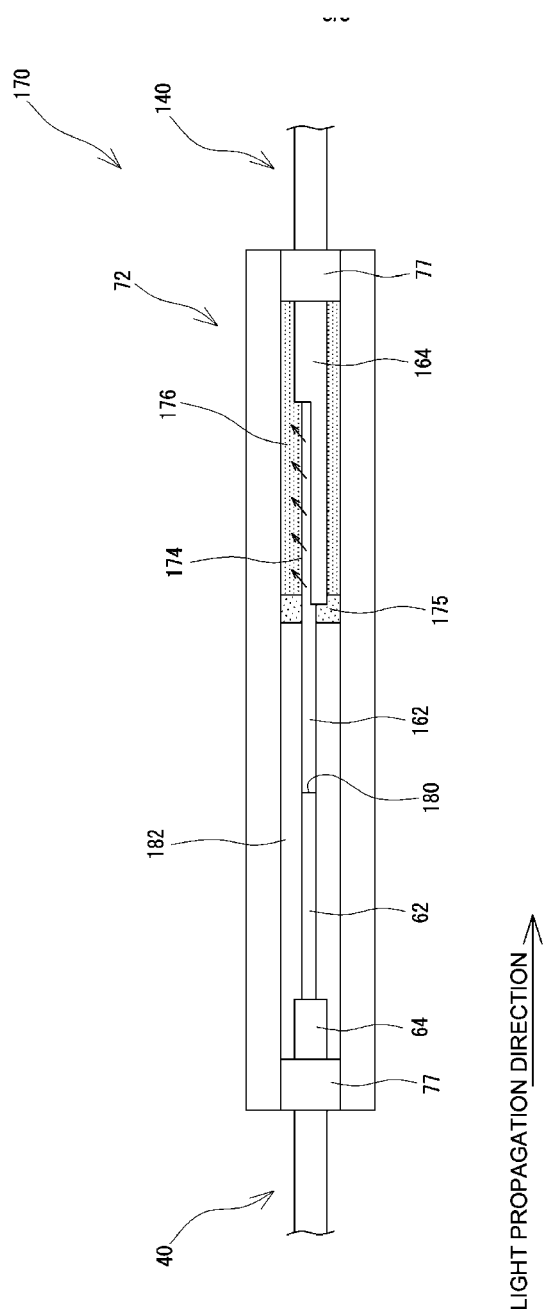
FIG. 9 is a schematic diagram showing a residual light removal structure according to a second embodiment of the present invention.

FIG. 9 is a schematic diagram showing a residual light removal structure 170 according to a second embodiment of the present invention. As shown in FIG. 9, in the present embodiment, the clad pumping fiber 40 is fused to an output optical fiber 140 located on a downstream side of the clad pumping fiber 40 within the fiber housing 72. Specifically, a covering material 64 is removed from a downstream end of the clad pumping fiber 40 over the whole circumference of the clad pumping fiber 40. A covering material 164 is also removed from an upstream end of the output optical fiber 140 over the whole circumference of the output optical fiber 140. The exposed end of the cladding 62 of the clad pumping fiber 40 and the exposed end of a cladding 162 of the output optical fiber 140 are fused at a fusion splicing point 180. For example, a double-clad fiber having a core that has not been doped with a rare earth element may be used for the output optical fiber 140.

Within the fiber housing 72, a portion of the covering material 164 is removed on a downstream side of the fusion splicing point 180 over part of the whole circumference of the output optical fiber 140, for example, within a range of angles less than 180° (e.g., 60°) about an axis of the output optical fiber 140 in a cross-section perpendicular to that axis, as with the clad pumping fiber 40 in the first embodiment. Therefore, the cladding 162 is exposed from the covering material 164 within this area to form a cladding exposure portion 174. As shown in FIG. 9, this cladding exposure portion 174 extends along a longitudinal direction of the output optical fiber 140 by a predetermined length.

Here, a resin (e.g., UV curable resin) 175 having a refractive index lower than a refractive index of the covering material 164 is formed on an upstream side of the cladding exposure portion 174. A space sealed by this resin 175 and the fiber housing 72 is filled with a resin (e.g., thermosetting resin) 176 having a refractive index that is equal to or higher than the refractive index of the cladding 162. The cladding exposure portion 174 is covered with the resin 176.

With such a configuration, residual pump light that has propagated through the cladding 62 of the clad pumping fiber 40 propagates through the cladding 62 of the clad pumping fiber 40 and through the cladding 162 of the output optical fiber 140 by means of an air cladding 182 formed within the fiber housing 72. When the residual pump light reaches an interface between the cladding exposure portion 174 of the output optical fiber 140 and the resin 176, it enters into the resin 176 since the refractive index of the resin 176 is equal to or higher than the refractive index of the cladding 162. Thus, the residual pump light is emitted to an exterior of the output optical fiber 140 (to the resin 176). Accordingly, it is possible to prevent generation of heat or fire that would be caused on a downstream side of the residual light removal structure 170 (for example, at the isolator 52 of FIG. 2 or the like) by residual pump light. Thus, the reliability of the emission optics can be improved.

In the cladding exposure portion 174 of the present embodiment, the cladding 162 is exposed only within a range of angles less than 180° of the whole circumference about the axis of the fiber. Therefore, the amount of the residual pump light emitted into the resin 176 at the most upstream part of the cladding exposure portion 174 can be reduced as compared to the conventional structure shown in FIG. 1 in which the cladding is exposed over the whole circumference of the fiber. Accordingly, it is possible to suppress local heat generation caused by residual pump light absorbed in the resin 176 and to improve the reliability of the residual light removal structure 170.

Furthermore, in the present embodiment, the resin 175 having a refractive index that is equal to or lower than the refractive index of the covering material 164 is disposed between the air cladding 182 and the resin 176. Therefore, the residual pump light emitted into the resin 176 from the cladding 162 and the resin 176 are prevented from leaking out to the air cladding 182. The present embodiment has been described with an example in which the air cladding 182 is formed within the fiber housing 72. Nevertheless, a material having a refractive index lower than those of the claddings 62 and 162 may be used instead of the air cladding 182.

As with the cladding exposure portion 74 of the first embodiment, the aforementioned cladding exposure portion 174 can be formed with use of an apparatus 80 as illustrated in FIG. 8.

EXAMPLE 1

First, a conventional residual light removal structure shown in FIG. 1 was produced as a comparison example. The double-clad fibers 510 and 610 included a core having a diameter of 10 μm and a cladding 530 or 630 having a diameter of 400 μm. An end of each of the covering materials 520 and 620 of the double-clad fibers 510 and 610 was removed along its axial direction by 20 mm so as to expose the claddings 530 and 630. Ultrasonic cleaning with ethanol was conducted to clean surfaces of the exposed claddings 530 and 630.

Within a reinforcement member 500 formed of a ceramic member having a coefficient of linear expansion that was adjusted to that of quartz glass, the claddings 530 and 630 of the double-clad fibers 510 and 610 were jointed and fused to each other. When the power of residual pump light propagating through the claddings 530 and 630 was calculated from the length of the double-clad fiber (clad pumping fiber) 510 and the amount of absorption of pump light in the claddings, it was about 6 W.

Opposite ends of the reinforcement member 500 and the double-clad fibers 510 and 610 were fixed with a hard UV curable resin. Furthermore, a thermosetting resin having a refractive index of 1.54 was used for the resin 540 filled into a space around the exposed claddings 530 and 630.

The fiber laser was operated in that state. The most upstream part 542 of the exposure portion of the cladding 530 was locally heated as expected and increased in temperature to about 85° C. Depending upon the heat resistance of the resin 540, the resin 540 suffers from heat deterioration when the temperature of the resin 540 increases during a production process. Then the amount of absorption of light increases, which causes an increased temperature of the resin 540. Thus, negative feedback is generated. According to calculation from experiments, the lifetime of the resin 540 used at that time was about 30,000 hours. It was found that the resin 540 had a very short lifetime.

A residual light removal structure 170 according to the second embodiment as shown in FIG. 9 was produced in the same manner. A thermosetting resin having a refractive index of 1.54 was used for the resin 176, and a UV curable resin having a refractive index of 1.37 was used for the resin 175. The same components as used in the aforementioned conventional residual light removal structure were used for components other than the aforementioned components.

The cladding exposure portion 174 was produced with use of the apparatus shown in FIG. 8. Specifically, the blade 84 was brought into contact with a surface of the output optical fiber 140 held by the holders 82 and moved in a longitudinal direction of the output optical fiber 140 by 30 mm to expose the cladding 162 from the covering material 164. Then the output optical fiber 140 was rotated through 20° about its axis. This cutting process was performed three times to expose the cladding 162 with an angle of 60° in total.

The fiber laser was operated under the same conditions as the test for the conventional residual light removal structure. The greatest temperature increase of the resin 176 was as low as 45° C. Thus, it was found that local temperature increase was reduced. When the lifetime of the resin 176 was calculated based on this result of the temperature increase, it would be 100,000 hours or longer. Thus, it is found that the lifetime can overwhelmingly be extended as compared to the conventional residual light removal structure.

EXAMPLE 2

A residual light removal structure 70 shown in FIG. 4 was produced as Example 2. The clad pumping fiber 40 included a core 60 having a diameter of 10 μm and a cladding 62 having a diameter of 400 μm. A portion of the covering material 64 of the clad pumping fiber 40 was shaved near the output end of the clad pumping fiber 40 with use of the apparatus illustrated in FIG. 8. Specifically, the blade 84 was brought into contact with a surface of the clad pumping fiber 40 and moved in a longitudinal direction of the clad pumping fiber 40 by 30 mm to expose the cladding 62 from the covering material 64. Then the clad pumping fiber 40 was rotated through 20° about its axis. This cutting process was performed three times to expose the cladding 62 with an angle of 60° in total.

A ceramic member having a coefficient of linear expansion that was adjusted into that of quartz glass was used for the fiber housing 72. A hard UV curable resin was used for the resin 77 located in opposite sides of the fiber housing 72. A thermosetting resin having a refractive index of 1.54 was used for the resin 76 filled in a space around the exposed cladding 62.

The fiber laser was operated in that state under the same conditions as in the test of Example 1. The greatest temperature increase was as low as 42° C. When the lifetime of the resin 76 was calculated based on this result of the temperature increase, it would be 100,000 hours or longer. Thus, it is found that the lifetime can overwhelmingly be extended as compared to the conventional residual light removal structure.

Although some preferred embodiments of the present invention have been described, the present invention is not limited to the aforementioned embodiments. It should be understood that various different forms may be applied to the present invention within the technical idea thereof.

INDUSTRIAL APPLICABILITY

The present invention is suitable for use in a residual light removal structure for removing residual light from light propagating through an optical fiber of a fiber laser.

DESCRIPTION OF REFERENCE NUMERALS AND SIGNS

1 fiber laser
10 signal light generator
20 pumping LD
30 optical coupler
32 output end
40 clad pumping fiber
42 output end
50 output optical fiber
52 isolator
60 core
62 cladding
64 covering material
70 residual light removal structure
72 fiber housing
74 cladding exposure portion
78 heat radiator plate
140 output optical fiber
162 cladding
164 covering material
170 residual light removal structure
174 cladding exposure portion
180 fusion splicing point
182 air cladding

The invention claimed is:

1. A residual light removal structure for removing residual light in a double-clad fiber having a core, a cladding covering the core and having a refractive index lower than a refractive index of the core, and a covering material covering the cladding and having a refractive index lower than the refractive index of the cladding, the residual light removal structure comprising:
   the double-clad fiber, the covering material including an upstream portion and a downstream portion extending continuously from the upstream portion;
   a fiber housing that houses part of the double-clad fiber;
   a cladding exposure portion in which part of a whole circumference of the cladding is exposed from the covering material along a longitudinal direction of the double-clad fiber and the remainder part of the whole circumference of the cladding is covered by the downstream portion of the covering material along the longitudinal direction; and
   a first resin filled within the fiber housing so as to cover at least the cladding exposure portion, the first resin having a refractive index that is higher than the refractive index of the cladding,
   wherein the upstream portion of the covering material covers a whole circumference of the cladding upstream of the cladding exposure portion.

2. The residual light removal structure as recited in claim 1, wherein the cladding exposure portion is formed with a range of angles less than 180° about an axis of the double-clad fiber in a cross-section perpendicular to the axis.

3. The residual light removal structure as recited in claim 1, wherein the fiber housing includes a heat radiator plate disposed so as to face the cladding exposure portion, the heat radiator plate having a good thermal radiation characteristic.

4. A fiber laser comprising:
   a signal light generator operable to generate signal light;
   a pump laser diode operable to generate pump light; and
   the residual light removal structure as recited in claim 1,
   wherein the signal light propagates through the core of the double-clad fiber of the residual light removal structure, and
   the pump light propagates through the cladding of the double-clad fiber of the residual light removal structure.

5. The fiber laser as recited in claim 4, wherein the cladding exposure portion is formed with a range of angles less than 180° about an axis of the double-clad fiber in a cross-section perpendicular to the axis.

6. The fiber laser as recited in claim 4, wherein the fiber housing includes a heat radiator plate disposed so as to face the cladding exposure portion, the heat radiator plate having a good thermal radiation characteristic.

7. The residual light removal structure as recited in claim 1, wherein the cladding exposure portion has an elongated shape having a longitudinal axis along the longitudinal direction of the double-clad fiber.

8. A residual light removal structure for removing residual light in a double-clad fiber having a core, a cladding covering the core and having a refractive index lower than a refractive index of the core, and a covering material covering the cladding and having a refractive index lower than the refractive index of the cladding, the residual light removal structure comprising:
- the double-clad fiber;
- a fiber housing that houses part of the double-clad fiber;
- a cladding exposure portion in which part of a whole circumference of the cladding is exposed from the covering material along a longitudinal direction of the double-clad fiber and the remainder part of the whole circumference of the cladding is covered by the covering material along the longitudinal direction;
- a first resin filled within the fiber housing so as to cover at least the cladding exposure portion, the first resin having a refractive index that is higher than the refractive index of the cladding; and
- a second resin filled on an upstream end of the cladding exposure portion within the fiber housing, the second resin having a refractive index lower than the refractive index of the covering material, the upstream end of the cladding exposure portion is an end located closest to a portion of the fiber where light begins to propagate.

9. The residual light removal structure as recited in claim 8, wherein the fiber housing includes a heat radiator plate disposed so as to face the cladding exposure portion, the heat radiator plate having a good thermal radiation characteristic.

10. A fiber laser comprising:
- a signal light generator operable to generate signal light;
- a pump laser diode operable to generate pump light; and
- the residual light removal structure as recited in claim 8,
- wherein the signal light propagates through the core of the double-clad fiber of the residual light removal structure, and
- the pump light propagates through the cladding of the double-clad fiber of the residual light removal structure.

11. The fiber laser as recited in claim 10, wherein the fiber housing includes a heat radiator plate disposed so as to face the cladding exposure portion, the heat radiator plate having a good thermal radiation characteristic.

12. The residual light removal structure as recited in claim 8, wherein the cladding exposure portion is formed with a range of angles less than 180° about an axis of the double-clad fiber in a cross-section perpendicular to the axis.

13. The fiber laser as recited in claim 10, wherein the cladding exposure portion is formed with a range of angles less than 180° about an axis of the double-clad fiber in a cross-section perpendicular to the axis.

14. The residual light removal structure as recited in claim 8, wherein the second resin is disposed adjoining to the first resin.

* * * * *